United States Patent

Batchu et al.

(10) Patent No.: US 9,544,288 B2
(45) Date of Patent: *Jan. 10, 2017

(54) MESSAGING GATEWAY

(71) Applicant: MOBILE IRON, INC., Mountain View, CA (US)

(72) Inventors: Suresh Kumar Batchu, Milpitas, CA (US); Mansu Kim, Cupertino, CA (US)

(73) Assignee: MOBILE IRON, INC., Mountain View, CA (US)

( * ) Notice: Subject to any disclaimer, the term of this patent is extended or adjusted under 35 U.S.C. 154(b) by 165 days.

This patent is subject to a terminal disclaimer.

(21) Appl. No.: 14/542,279

(22) Filed: Nov. 14, 2014

(65) Prior Publication Data

US 2015/0135288 A1    May 14, 2015

Related U.S. Application Data

(63) Continuation of application No. 14/216,482, filed on Mar. 17, 2014, now Pat. No. 8,918,529.

(60) Provisional application No. 61/799,759, filed on Mar. 15, 2013.

(51) Int. Cl.
*G06F 15/16* (2006.01)
*H04L 29/06* (2006.01)

(52) U.S. Cl.
CPC ............... *H04L 63/08* (2013.01); *H04L 63/04* (2013.01); *H04L 63/20* (2013.01); *H04L 63/0823* (2013.01)

(58) Field of Classification Search
CPC .................................................. H04L 63/04
USPC ........................................................ 709/229
See application file for complete search history.

(56) References Cited

U.S. PATENT DOCUMENTS

| | | | | |
|---|---|---|---|---|
| 8,402,525 B1* | 3/2013 | Shah | ................... | H04L 41/0273 726/28 |
| 8,468,330 B1* | 6/2013 | Reed | ..................... | G06F 21/51 713/164 |
| 2005/0169285 A1* | 8/2005 | Wills | ..................... | H04L 29/06 370/401 |
| 2008/0288607 A1* | 11/2008 | Muchow | ............. | G06F 9/44505 709/209 |
| 2010/0227632 A1* | 9/2010 | Bell | ..................... | H04L 12/1859 455/466 |
| 2012/0173610 A1* | 7/2012 | Bleau | ..................... | H04L 67/26 709/203 |
| 2012/0198268 A1* | 8/2012 | Qureshi | ............. | G06F 11/1443 714/4.1 |
| 2012/0240212 A1* | 9/2012 | Wood | ..................... | G06F 21/33 726/10 |
| 2012/0290740 A1* | 11/2012 | Tewari | ................. | H04W 4/00 709/248 |
| 2012/0303774 A1* | 11/2012 | Wilson | ................. | H04L 67/26 709/223 |
| 2013/0190032 A1* | 7/2013 | Li | ......................... | H04L 67/28 455/517 |
| 2013/0268645 A1* | 10/2013 | Shah | ................... | H04L 41/0273 709/223 |

(Continued)

*Primary Examiner* — Imad Hussain
(74) *Attorney, Agent, or Firm* — Van Pelt, Yi & James LLP

(57) ABSTRACT

A notification message gateway is disclosed. Notification data and application identification data is received. The application identification data is used to select an application credential associated with at least one application instance. The notification data and application credential are provided to a distribution node such that the notification data is provided to the application instance.

20 Claims, 9 Drawing Sheets

(56) References Cited

U.S. PATENT DOCUMENTS

2014/0012949 A1\* 1/2014 Meyers ............... H04L 67/1095
709/217
2014/0089485 A1\* 3/2014 Boberg ................ H04W 8/245
709/223

\* cited by examiner

MESSAGING GATEWAY

CROSS REFERENCE TO OTHER APPLICATIONS

This application is a continuation of co-pending U.S. patent application Ser. No. 14/216,482, entitled MESSAGING GATEWAY filed Mar. 17, 2014, which claims priority to U.S. Provisional Patent Application No. 61/799,759 entitled MESSAGING GATEWAY filed Mar. 15, 2013, both of which are incorporated herein by reference for all purposes.

BACKGROUND OF THE INVENTION

Push notification features are commonly employed in mobile applications. For example, push notification data (e.g., push notifications) may include a message (e.g., text), sound, image (e.g., badges), commands, and/or other information. A push notification may, in certain cases, be output to a mobile device user (e.g., in a dialog window, banner, as a sound, etc.). Providing push notification capabilities in an application may require significant infrastructure. For example, providing push notifications to an application may require maintenance of push message server(s), management of application credentials (e.g., application push token(s), registration identity (ID), notification keys), and/or other infrastructure.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A notification message gateway is disclosed. In various embodiments, a mobile device management (MDM) architecture may be used to provide notification data (e.g., push messages) to applications, devices, users, and/or other nodes. In various embodiments, notification data and application identification data is received. The application identification data is used to select an application credential associated with at least one application instance. The notification data and application credential are provided to a distribution node such that the notification data is provided to the application instance. In some embodiments, the distribution node may include an operating system (OS)-based notification platform, management agent on a mobile device, browser application (e.g., associated with browser-based applications), and/or other node.

Figure 1:
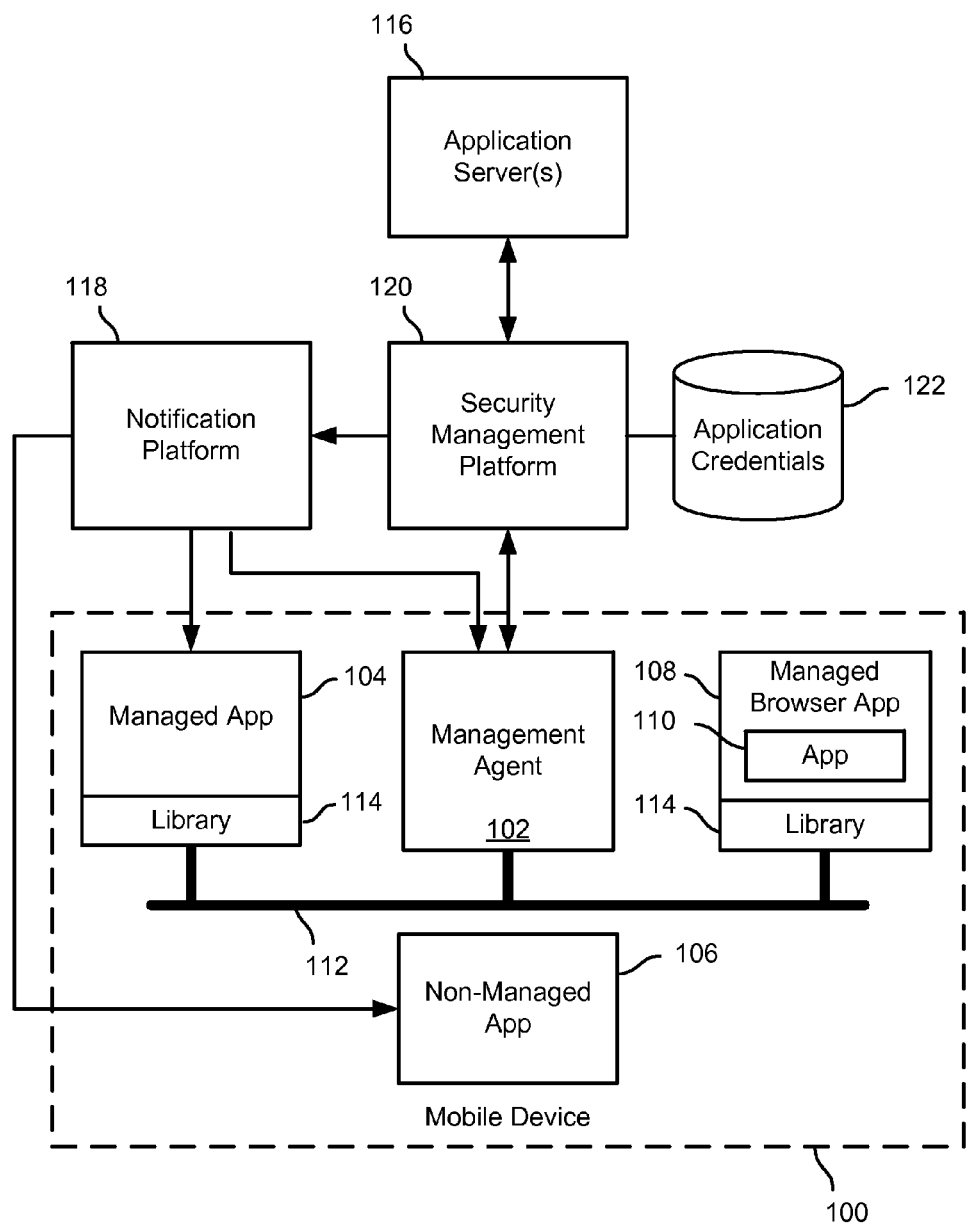
FIG. 1 is a block diagram illustrating an embodiment of a system including a messaging gateway.

FIG. 1 is a block diagram illustrating an embodiment of a system including a messaging gateway. In the example shown, a mobile device 100 (e.g., smartphone, tablet, etc.) includes a management agent 102 (e.g., a mobile device management (MDM) agent, a trusted management agent, trust client app), managed application(s) 104 (e.g., managed client application(s)), non-managed application(s) 106 (e.g., non-authorized application(s), untrusted application(s)), and/or other applications. In some embodiments, a mobile device 100 may include managed browser application(s) 108. A managed browser application 108 may include, for example, a type of managed application 104. A managed browser application 108 may include (e.g., be associated with) one or more browser-based applications 110 (e.g., hypertext markup language 5 (HTML5) applications, web clips, JavaScript applications, etc.).

In various embodiments, the management agent 102, managed applications 104, managed browser applications 108, and/or other applications may be components of an MDM system. The management agent 102, managed applications 104, managed browser applications 108, and/or other components may be configured to share information/data in a trusted manner via a secure mobile application connection bus 112 (e.g., secure inter-application connection bus, secure application command bus, secure application communication bus, etc.). For example, information may be shared in a trusted manner among applications authorized to access the secure connection bus 112. In some embodiments, data may be transferred in a trusted manner among applications authorized to have access to the secure mobile application connection bus 112 by storing the data in an encrypted form in a data storage location (e.g., a paste board, shared keychain location, and/or other storage), which is accessible to the entities authorized to communicate via the bus 112. In various embodiments, data may be transferred in a trusted manner from a first application (e.g., the management agent 102) to a second application (e.g., a managed application 104, managed browser application 108) authorized to have access to the secure mobile application connection bus 112 by calling a uniform resource locator (URL) scheme associated with the second application including the encrypted data.

In some embodiments, a library 114 (e.g., a library compiled into an application, included in the application by wrapping, injected into the application) may be associated with a managed application 104, managed browser application 108, and/or other node(s). The library 114 may modify an application's code to behave differently than the corresponding unmodified version of the application behaves. The library 114 may configure an application to allow a management agent 102 to perform actions on behalf of the application including, for example, invoking mobile operating system operations, using mobile device resources, accessing/storing application data, monitoring application usage, and/or performing other operations. The library 110 may mediate communication between a managed application 104 and the management agent 102 and/or other managed application(s) 104. In some embodiments, a library may generate application credentials (e.g., a globally unique identifier (GUID) string associated with the application instance) for a managed application 104.

According to some embodiments, a mobile device 100, management agent(s) 102, managed applications 104, managed browser applications 108, non-managed applications 106, and/or other nodes may receive notification data from an OS-based notification platform 118, a security management platform 120, and/or other node.

In some embodiments, notification data from an application server 116 may be provided to the notification platform 118 via a security management platform 120 associated with the device 100. In some embodiments, an application server 116 may include a server associated with an application (e.g., included on a device). An application server 116 may, for example, manage the server-side functionality of an application. For example, an application server 116 may prepare notification data to be sent to the application. Notification data (e.g., push notification data) may include, for example, a message (e.g., text message, image, video, etc.), a badge, a sound (e.g., an alert), an image, a news update, a command to retrieve data (e.g., from the application server), and/or any other type of data. An application server 116 may, for example, receive data intended for an application from, for example, one or more content sources. In various embodiments, the application server 116 may generate application identification information identifying, for example, one or more application instances (e.g., application contexts), devices, users, groups of users, device locations, application revisions, and/or other entities. The application server 116 may provide notification data and application identification data to a security management platform 120.

In various embodiments, a security management platform 120 (e.g., a virtual smartphone platform, security management server, management server, etc.) manages configuration(s), polic(ies), and/or settings associated with the mobile device 100. The security management platform 120 may manage (e.g., control, dictate, determine) the configurations, policies, settings, and/or other functional aspects of one or more of the managed applications 104 on the mobile device 100.

In various embodiments, the security management platform 120 may receive notification data, application identification data, and/or other information. For example, the security management platform 120 may extend an application programming interface (API) to application server(s) 116 and/or other nodes. Notification data, application identification information (e.g., identifying applications, devices, users, locations, etc.), and/or other information may be received at the security management platform via the API. In various embodiments, notification data, application identification data, and/or other information may be received at the security management platform via an interface (e.g., web interface, console, etc.).

In some embodiments, the security management platform 120 may select application credentials associated with one or more application instances (e.g., installations of an application on one or more devices) based on the application identification information. In various embodiments, the security management platform may be associated with a database of application credentials 122 (e.g., application credential repository, data structure, table, etc.). The application credential database 122 may be queried/searched (e.g., by the security management platform 120) based on the application identification data. And, one or more application credentials may be selected.

According to some embodiments, the security management platform 120 may determine one or more distribution nodes (e.g., based on the notification data, application credentials, and/or other information). Distribution nodes may include, for example, an OS-based notification platform 118, a management agent 102, and/or other node. The notification data and application credentials (e.g., collectively referred to as notification data package) may be provided to the selected distribution node. In various embodiments, a management agent 102 may be selected as a distribution node, and the notification data and application data credentials may be provided to the management agent 102 for distribution to an application instance identified by the application credentials. In various embodiments, an OS-based notification platform may be selected as a distribution node, and the notification data and application data credentials may be provided to the OS-based notification platform 118.

In some embodiments, an OS-based notification platform 118 may be associated with an OS included in the mobile device 100. For example, a notification platform 118 may include an Apple® Push Notification Service (APNS), Google® Cloud Messaging (GCM) server, Windows Notification Service, and/or other notification platform. The OS-based notification platform 118 may include gateway node to route notification data to one or more applications across one or more devices 100. In various embodiments, a mobile device 100 may establish a secure and/or accredited connection with the OS-based notification platform 118. For example, an application may register with the OS-based notification platform 118 (e.g., upon installation of the application). For example, the registration process may include generation of application credentials, which allow an application to receive notifications from the notification platform 118. In various embodiments, application credentials may include, for example, push notification token(s)

(e.g., a push token for an OS push notification system (e.g., APNS token, Microsoft® Windows8 push notification token, etc.), registration identification (ID) (e.g., a GCM registration ID, notification key, etc.), an application identifier associated with an MDM system, and/or other credential information associated with a messaging architecture (e.g., a push notification architecture/system). For example, the application credentials may be used to facilitate communications (e.g., data transfer) from an application server 116 to an application (e.g., managed application 104, non-managed application 106, managed browser application 110, etc.).

In various embodiments, the OS-based notification platform may provide notification data and/or application credentials to an OS associated with the mobile device 100. In some embodiments, an application may register with the OS-based notification platform 118 to generate application credentials. In various embodiments, the OS associated with the device 100 and/or a notification node associated with the OS (not shown) may receive the notification data and provide the notification data to application(s) associated with the application credentials.

Figure 2:
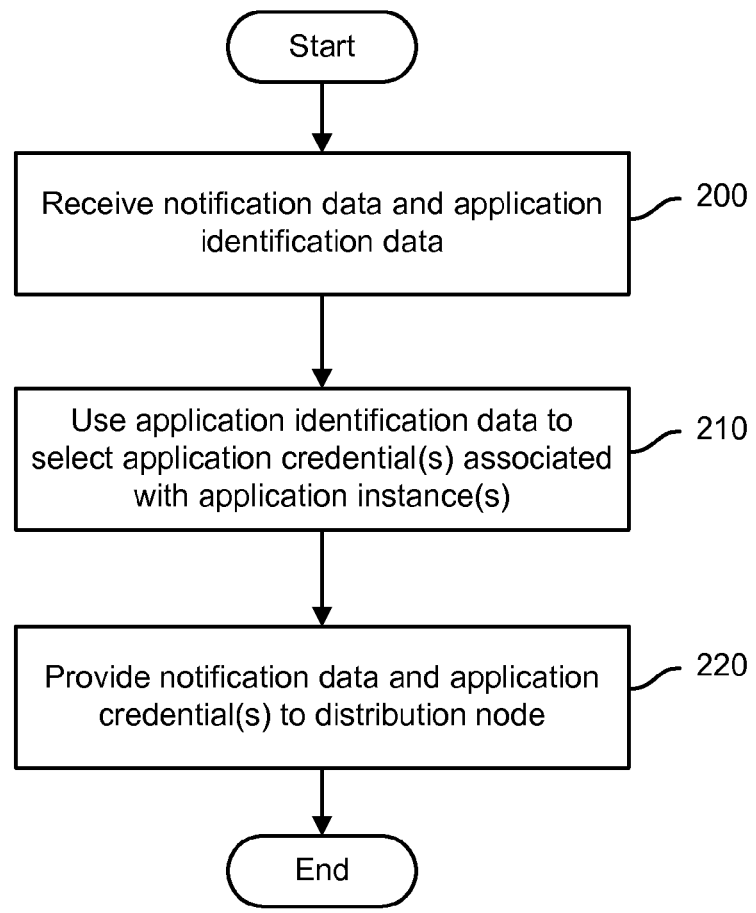
FIG. 2 is a flow chart illustrating embodiments of a process of providing notification data to an application.

FIG. 2 is a flow chart illustrating embodiments of a process of providing notification data to an application. In various embodiments, the process is performed by the system 100 of FIG. 1. At 200, notification data and application identification data may be received. In various embodiments, the notification data and application data may be received at, for example, a security management platform (e.g., management server) associated with one or more mobile devices.

In various embodiments, a security management platform may expose an application programming interface (API) at an application server, a console at the security management platform, and/or other node. The API may be called, and notification data, application identification information, and/or other information may be provided to the security management platform via the API. For example, an API may be called automatically upon, for example, receipt of data at the application server (e.g., from content sources) and/or other events.

In some embodiments, an interface may be provided to a user (e.g., an administrator at the security management platform, application server, and/or other node), and the user may provide notification data, application identification data, and/or other data in the interface. For example, an administrator may provide and/or select notification data, application identification data, and/or other information in a web interface provided by the security management platform.

At 210, the application identification data may be used to select an application credential associated with an application instance. In various embodiments, application identification information may be processed to select application credentials associated with one or more application instances. For example, the application identification information (e.g., received at the security management platform) may include application identification information, application revision information, user information, device information, user group information, location information, and/or other information. This information may be used to select one or more instances of an application included (e.g., installed) on one or more mobile devices. For example, application identification information may be used to query a database including application credential information. In various embodiments, a security management platform may be associated with a database including application credentials, application identification information, and/or other data. The data structure may be queried based at least in part on the application identification information to select one or more application credentials associated with one or more application instances (e.g., applications intended to receive the notification data).

At 220, the notification data and application credential(s) may be provided to a distribution node. In various embodiments, the distribution node (e.g., gateway node) may include a OS-based notification platform (e.g., OS-based notification platform 118 of FIG. 1), a management agent (e.g., management agent 102 of FIG. 1), and/or other node. A distribution node may be determined, for example, based on application attributes associated with an application instance (e.g., OS-based push-messaging configured, OS-based push messaging not configured, etc.). For example, in the event it is determined that the application instance is configured for OS-based push messaging (e.g., APNS, GCM, Windows, and/or other push messaging), the notification data and/or application credentials may be provided to an OS-based notification platform. And the OS-based notification platform may provide the notification data to the mobile device (e.g., the device OS, a node associated with the OS) including the application instance. In another example, it may be determined that the application instance is not configured for OS-based push messaging. In this case, the notification data may be provided to a management agent and/or other node associated with the application instance.

Figure 3:
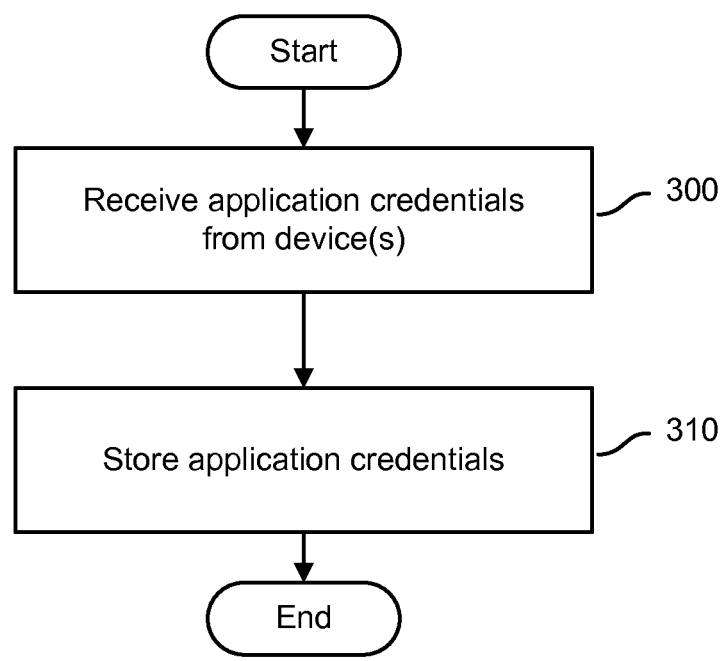
FIG. 3 is a flow chart illustrating embodiments of a process of storing application credentials.

FIG. 3 is a flow chart illustrating embodiments of a process of storing application credentials. In various embodiments, the process is performed by the system 100 of FIG. 1. At 300 application credentials may be received from one or more mobile devices. In various embodiments, a management agent associated with one or more managed applications on a device may provide application credentials (e.g., push notification tokens, registration IDs, notification keys, etc.) to a security management platform. For example, a management agent may retrieve application credentials from one or more managed applications and provide the application credentials to the security management platform. The management agent may, for example, retrieve the application credentials from a library associated with a managed application as discussed below.

At 310, application credentials may be stored. In various embodiments, application credentials may be stored in a database of application credentials (e.g., an application credentials repository). The database of application credentials (e.g., application credentials repository 122 of FIG. 1) may, for example, be associated with the security management platform. In various embodiments, the database may include a data structure (e.g., table) including devices (e.g., device identifiers), application instances (e.g., application bundle identifiers, and/or other application identifiers), application installation status(es) (e.g., installed, uninstalled, etc.), application credentials (e.g., push notification tokens, registration IDs, notification keys, GUIDs, and/or other application credentials), application attributes (e.g., OS-based push messaging enabled, OS-based push messaging not enabled), devices (e.g., device identifiers), device location information (e.g., geographic location of device, networks which the device is connected, etc.), user information (e.g., demographic information, behavioral information), user group information (e.g., employee group(s)), and/or other information. Table 1 below is an example data structure of application credential information.

TABLE 1

Example application credential data structure.

| Device | Application | App Version | State | OS-Based Notification | App Credentials |
|---|---|---|---|---|---|
| 1234 | BrowserApp | 1.0.2 | Installed | Enabled | Token1 |
| 1234 | FileAccessApp | 2.1 | Installed | Disabled | App ID (GUID) |
| 5678 | BrowserApp | 2.0 | Installed | Enabled | Token2 |

In some embodiments, application identification information may be used to, for example, select (e.g., look up) one or more application credentials associated with one or more application instances (e.g., applications intended to receive the notification data) as discussed below. In some embodiments, application identification information may be used to, for example, select (e.g., look up) a distribution node as discussed below.

Figure 4:
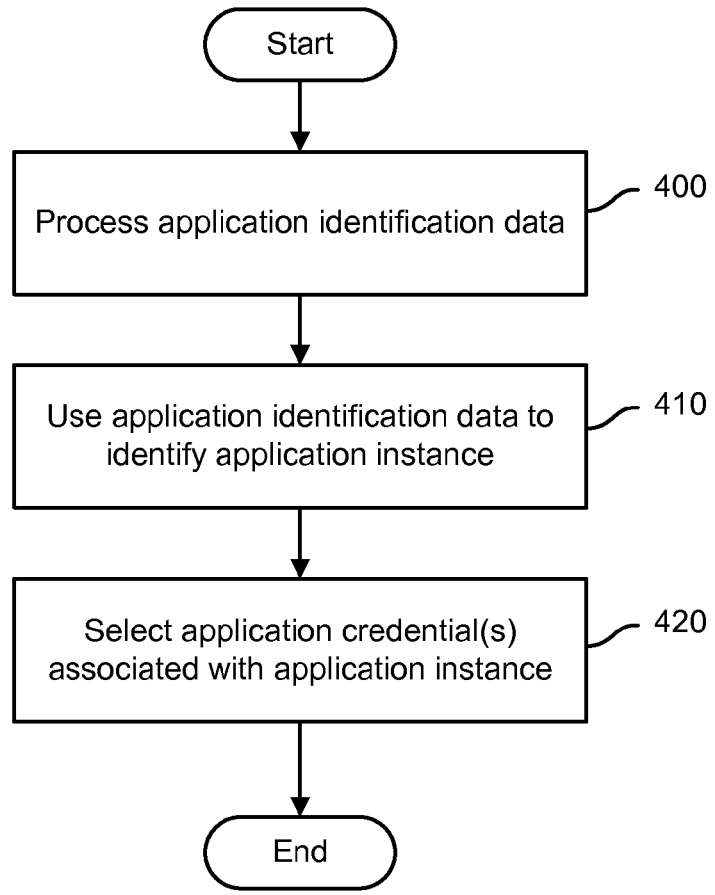
FIG. 4 is a flow chart illustrating embodiments of a process of selecting application credentials.

FIG. 4 is a flow chart illustrating embodiments of a process of selecting application credentials. In various embodiments, the process is performed by the system 100 of FIG. 1. In the example shown, at step 400 application identification data may be processed. In various embodiments, notification data and application identification data may be received at a security management platform and/or other node. The application identification information may include information identifying applications, devices, users, and/or groups of users to receive (e.g., intended to receive) the notification data. Application identification data may be processed (e.g., parsed) to extract any identification information used to determine one or more application instances to receive the notification data. In various embodiments, this step may be optional.

In various embodiments, application identification data may include data associated with one or more applications, users, groups of users, devices, locations, times, and/or other data. For example, application identification data may specify that notification data be provided to all instances of an application (e.g., a managed browser) across one or more devices. In another example, it may be specified that notification data be provided to one or more instances of an application associated with a group of users (e.g., employees in a department (e.g., sales)). In a further example, it may be specified that a notification data be provided to one or more instances of an application (e.g., an enterprise document viewer) included on devices in a certain location (e.g., in an office building). In this case, it may be specified that notification data be sent to all devices (e.g., including an application) that are located in a certain area (e.g., an office building) to, for example, inform the device/application users of an event (e.g., an emergency). In another example, it may be specified that notification data be provided to one or more instances of an application (e.g., an enterprise resource planning (ERP)) included on devices owned by an employee (e.g., operating in a bring your own device (BYOD) environment). In a further example, it may be specified that notification data be provided to one or more application instances based on time-based parameters (e.g., all application instances that have not been used within at least a week). In a further example, it may be specified that notification data be provided to one or more application instances based on a version of the application instance (e.g., all instances of an application older than version 2.0, etc.). In addition to these examples, any combination of application identification data discussed herein and/or known in the art may be used to specify applications (e.g., application instances), devices, and/or users to receive notification data.

At 410, application identification data may be used to identify application instance(s). In various embodiments, application identification data may be used to search (e.g., query) a database of application credentials (e.g., application credential data repository 122 of FIG. 1). For example, application identification information may be used (e.g., as criterion) to identify application instances associated with one or more applications. Continuing with an above example, the application identification information may specify that notification data be provided to one or more instances of an application included on mobile device(s) in a location (e.g., a geographic location, office, building, etc.). The location may be used to look-up one or more application instances in the database (e.g., data structure) of application credentials. For example, one or more instances of the application included on devices known to be in the location (e.g., within a radius of the location) may be identified.

At 420, application credentials associated with the application instances may be selected. In various embodiments, application credentials associated with one or more application instances may be selected from a set of application credentials (e.g., a data structure, database, etc.). The set of application credentials may include application credentials received from management agents, applications, mobile devices and/or other nodes. Application identification data may be used to query a database of application credentials (e.g., a table of application credentials), and based on the application identification data one or more application instances may be identified. Application credentials associated with the identified application instances may be selected. Continuing with the example above, an instance of an application included on device known to be in a location (e.g., a geographic area) may be identified. Based on a query (e.g., search) of an application credential database, application credentials (e.g., push notification tokens, registration IDs, notification keys, etc.) associated with the identified application instance may be selected. In various embodiments, the notification data and the application credentials may be provided to a distribution node (e.g., OS-based push notification platform, management agent, and/or other node).

Figure 5:
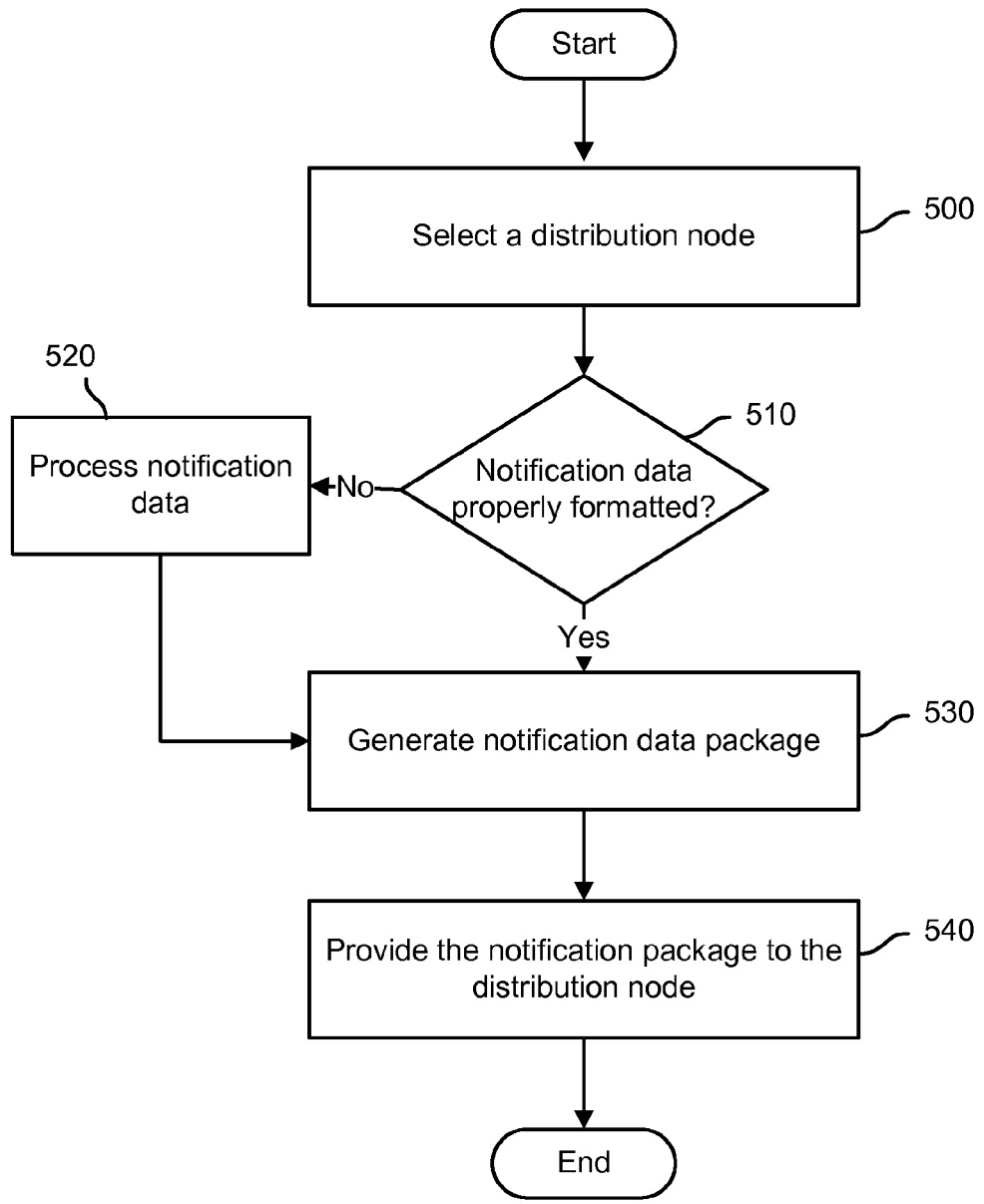
FIG. 5 is a flow chart illustrating embodiments of a process of providing a notification data package to a distribution node.

FIG. 5 is a flow chart illustrating embodiments of a process of providing a notification data package to a distribution node. In various embodiments, the process is performed by the system 100 of FIG. 1. At 500, a distribution node may be selected. In various embodiments, notification data, application identification information, application credentials, and/or other information may be used to select (e.g., determine) a distribution node (e.g., a gateway node, forwarding node). In some embodiments, a distribution node may be selected based on application credentials associated with one or more application instances that are intended to receive notification data. For example, application credentials associated with one or more application instances may be determined, and the application credentials may be used to select a distribution node. In some embodiments, a distribution node may be determined based on a type of application credential. For example, if an application credential includes a push notification token associated with an OS-based notification platform (e.g., APNS), the OS-based notification platform may be selected as the distribution node. In another example, if an application credential includes an application identifier (e.g., an application GUID) associated with a mobile device management platform, a management agent associated with the application credentials (e.g., application identifier) may be selected. In another example, if an application credential does not include a credential associated with an OS-based notification platform, a management agent associated with an MDM platform may be selected as the distribution node. In this case, the fact that application credential for application instance does not include a credential associated with an OS-based notification platform may indicate that the application instance is not configured to receive notification data from the OS-based notification platform.

In some embodiments, a distribution node may be selected based on data retrieved from an application credential database. For example, an application credential database (e.g., table) may include information indicating whether an application is configured for OS-based push notification messaging, MDM-based notification messaging, and/or another type of notification messaging. An application, for example, may or may not be configured for OS-based push notifications (e.g., the application may or may not include the necessary code to receive OS-based push notifications). An OS-based notification service may be selected as a distribution node in the event the application is configured to receive OS-based notifications. In the event an application instance is not configured for OS-based notification, a management agent and/or other node associated with an MDM architecture may be selected. In certain cases, an application instance may be temporarily unable to receive OS-based push notifications, and a management agent and/or other node associated with an MDM architecture may be selected. For example, an application instance may be included on a device that is located (e.g., temporarily located) in an area (e.g., country, county, cellular zone, jurisdiction, etc.) that prohibits (e.g., restricts, blocks) OS-based push notification, and information reflecting this restriction may be stored in the application credential database.

In various embodiments, a distribution node may be selected based on a connection status between the security management platform and mobile device (e.g., management agent included on the device). In some embodiments, a management agent may be configured to maintain a continuous connection (e.g., a persistent connection) with the security management platform). In various embodiments, a management agent may be configured to connect to the security management platform periodically (e.g., at configured intervals). The management agent may, for example, be configured to connect to the security management platform at intervals to retrieve/send updates, receive pending commands, and/or perform other operations. In the event that the management agent is connected to the security management platform, the management agent may be selected as a distribution node. In the event that the management agent is not connected to the security management platform, an OS-based notification platform and/or other node may be selected as a distribution node. In some embodiments, a connection status associated with a management agent may be stored in a database (e.g., associated with the security management platform).

In various embodiments, potential distribution nodes may be prioritized and/or ranked. One or more distribution nodes may be selected based on a ranking of the potential distribution nodes. For example, an OS-based notification platform may be prioritized as the preferred distribution node over, for example, a management agent and/or other nodes. Based on this prioritization, the OS-based notification platform may be selected over the management agent and/or other nodes. In certain cases, other factors (e.g., network availability) may trump and/or affect the prioritization of distribution nodes.

In some embodiments, distribution nodes may be selected on an application instance by application instance basis. For example, a first instance of the application (e.g., installed on a first type of device) may be configured to receive notification data via an OS-based notification platform while a second instance of the same application (e.g., on a second device) is not configured to receive notification data via an OS-based notification platform. In this case, the notification data may be provided to the first application instance via the OS-based notification platform and to the second application instance via a management agent and/or other node associated with the second application instance. This scenario may arise, for example, when the OS-based notification service is blocked, restricted, and/or disabled on the second device.

At 510, it may be determined whether notification data is properly formatted. In various embodiments, notification data and application identification data may be received via an API, interface, and/or console. It may be determined whether the notification data is in a proper format. For example, OS-based notification platforms may require that notification data be under a certain size (e.g., 256 bytes). In another example, some OS-based notification platforms may permit notification data to be sent as plain text notification data while others may require the notification data to be a data object (e.g., a JavaScript object notation (JSON) object). In a further example, it may be determined whether the notification data should be encrypted. For example, it may be determined based on a level of security associated with the distribution node whether the notification data should be encrypted. In the event the notification data is determined to be properly formatted, the process may proceed to step 530. In the event the notification data is determined to be not properly formatted, the process may proceed to step 520.

At 520, the notification data may be processed. In some embodiments, the notification data may be processed to generate properly formatted notification data. For example, it may be determined that a size (e.g., file size) of the notification data is too large (e.g., greater than 256 bytes), and the notification data size may be reduced (e.g., compressed). In another example, a notification data may be converted to a proper format (e.g., JSON object, plain text, etc.) based on, for example, the requirements of a distribution node. In a further example, notification data may be encrypted if necessary.

At 530, a notification data package may be generated. In some embodiments, a notification data package (e.g., payload) may include notification data, application credentials, and/or other data. In some embodiments, notification data package may include separate application credential information and notification data (e.g., a notification message object). For example, an OS-based notification platform may specify that notification data (e.g., a notification payload) and application credentials (e.g., push notification token, registration ID, notification key, etc.) be provided along with the notification data (e.g., as two separate files/objects). In another example, an OS-based notification platform may specify that application credentials be included in the notification data (e.g., in a notification data payload). Application credentials may, for example, be included as a header to the notification data, in a "to:" field associated with the notification data, and/or otherwise associated with the notification data.

In various embodiments, application credential information may be included in a body of notification data. In some embodiments, a management agent may act as a proxy for an application instance and may receive notification data from an OS-based notification platform on behalf of the application instance. In this case, application credential information may include application credentials associated with the management agent and/or application credentials associated with the application instance. For example, application credentials (e.g., a push notification token) associated with the management agent may be included in the notification data package and application credentials (e.g., a globally unique identifier (GUID) string) for the application instance may be included in the notification data intended for the application instance. As discussed below, the management agent may, for example, receive the notification data package, determine that the notification data is intended for the application instance based on the application credentials in the notification data, and/or provide the notification data to the application instance.

According to some embodiments, the notification data may include one or more commands, application credentials, and/or other data. For example, notification data may include application credentials and a command to retrieve additional notification data from the security management platform. This notification data may, for example, be sent to a management agent on the device, and the management agent may retrieve the additional notification data from the security management platform as discussed below.

At 540, the notification data package may be provided to the distribution node. In various embodiments, application credentials, notification data, and/or other data comprising the notification package may be sent to a selected distribution node. For example, a notification package may be provided to an OS-based distribution platform, a management agent on a mobile device, and/or other node associated with an application instance intended to receive the notification data.

In some embodiments, a security management platform may be authenticated with an OS-based notification platform. For example, a security management platform may register with an OS-based notification platform to send notification data to one or more applications. The security management platform may, for example, register with the OS-based notification platform on behalf of one or more application servers and/or other nodes. Upon registration, the security management platform may receive a certificate. The certificate may, for example, be used to authenticate with OS-based notification platform to send notification data to one or more applications (e.g., associated with the certificate). In another example, a security management platform may register with an OS-based notification platform by providing log-in information (e.g., associated with an application). Upon authentication, the security management platform may provide the notification package (e.g., including notification data, application credentials, and/or other information) to the OS-based platform.

In various embodiments, an OS-based platform may receive the notification package and provide the notification data, application credentials, and/or other information to an application associated with the application credentials. In one example, the application credentials may be associated with an application instance on a device, and the notification package may be provided to the OS on the device (e.g., an element of the OS, the OS kernel) for delivery to the application. This scenario may include a direct notification delivery case/mode.

In some embodiments, the application credentials (e.g., included in the notification data package) received at the OS-based notification platform may be associated with a management agent. In this case, the notification package may be provided from the OS-based notification platform to the management agent (e.g., via the OS on the mobile device). As discussed below, the notification data (e.g., included in the notification package) may include application credentials (e.g., a bundle ID associated with an application, GUID string, etc.) associated with one or more application instances, and the management agent may provide the notification data to the application instances.

Figure 6:
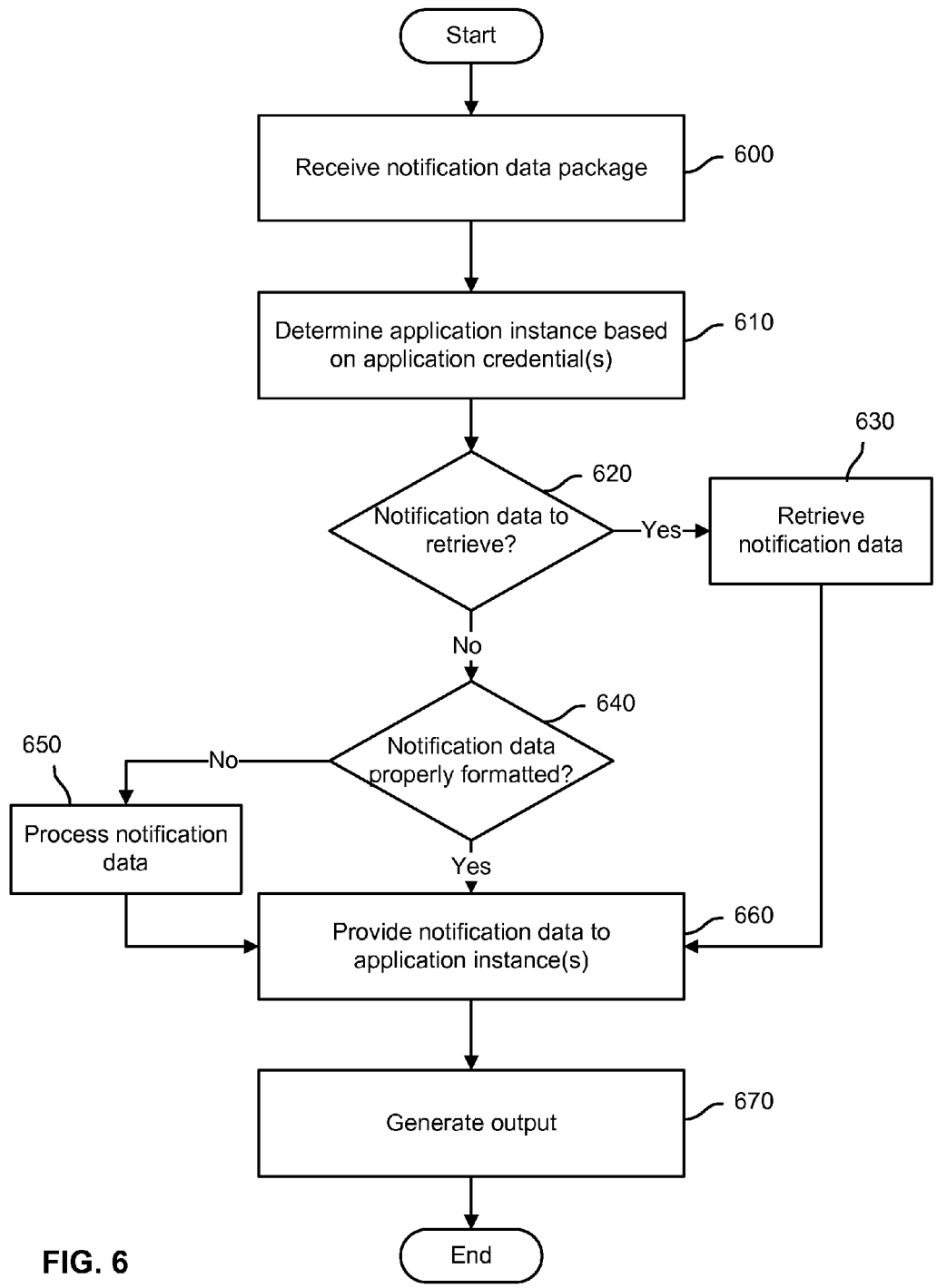
FIG. 6 is a flow chart illustrating embodiments of a process of providing notification data to an application instance.

FIG. 6 is a flow chart illustrating embodiments of a process of providing notification data to an application instance. In various embodiments, the process is performed by the system 100 of FIG. 1. In various embodiments, the process of FIG. 6 may illustrate an embodiment in which a management agent acts as a proxy for an application instance. At 600, a notification data package may be received. In various embodiments, the notification data package (e.g., including notification data, application credentials, etc.) may be received at a management agent. The management agent may, for example, include a management agent associated with an instance of an application that is intended to receive notification data included in the notification data package. In some embodiments, the management agent may receive the notification package from an OS-based notification platform, a security management platform (e.g., directly from the security management platform), and/or another node.

At 610, an application instance may be determined based on the application credentials. In some embodiments, notification data (e.g., a notification data object, message, etc.) may include application credentials (e.g., a bundle ID associated with an application, GUID string, etc.) associated with at least one application instance. The application credentials may, for example, be included in a body of the notification data (e.g., notification data object). In some embodiments, the notification data may be parsed and/or processed to identify one or more application credentials included therein.

According to some embodiments, application instances may be determined based on the application credentials included in the notification package. For example, notification data may include an application credentials (e.g., bundle ID, GUID) associated with an instance of a managed browser application on the mobile device. It may be determined based on the application credentials that the managed browser instance is the intended recipient of the notification data.

At 620, it may be determined whether additional notification data is to be retrieved (e.g., from the security management platform). In various embodiments, an OS may include background push notification capabilities. For example, applications may be configured to receive push notifications in the background (e.g., while the application is not active). In this case, applications may receive notification data (e.g., push messages) without displaying information to a user.

In some embodiments, notification data may be received at a management agent operating in the background (e.g., an inactive state). In this case, the notification data may include commands (e.g., instructions) to retrieve/fetch data (e.g., messages, files, etc.) to be sent to an application instance. In the event the notification data includes commands to retrieve/fetch data (e.g., from a security management platform), the process may proceed to step 630. In the event the notification data does not include commands to retrieve data (e.g., additional notification data), the process may proceed to step 640.

At 630, notification data may be retrieved (e.g., from a security management platform, application server, and/or other node). In various embodiments, in response to the notification data, the management agent may retrieve data (e.g., additional notification data, files, application data, etc.) from, for example, the security management platform. For example, the data retrieved from the security management platform may include content (e.g., a new periodical for a news application) associated with an application instance, a message, application update data, and/or other information. In various embodiments, the technique of sending notification data including a command for the management agent to retrieve data for an application instance may be used if the data intended for the application exceeds the size requirements associated with an OS-based notification platform.

At 640, it may be determined whether the notification data is properly formatted. In various embodiments, the management agent may determine whether the notification data is properly formatted to be displayed, ingested, and/or otherwise used by an application instance. In the event the notification data is properly formatted, the process may proceed to step 660. In the event the notification data is not properly formatted, the process may proceed to step 650.

At 650, the notification data may be processed. In various embodiments, the management agent may process the notification data for display, ingestion, and/or use by an application instance. For example, notification data (e.g., intended for an application instance) may be received at the management agent in a format not compatible with an application instance. The management agent may format the notification data for use (e.g., consumption) by the application instance. In another example, notification data received at the management agent may include application credentials (e.g., a GUID associated with the application instance), commands, and/or other information not intended for the application instance. The notification data may be parsed to identify application credentials and/or other information. And the application credentials may be removed from the notification data. Other process operations may be performed to prepare the notification data for use by the application instance.

At 660, the notification data may be provided to one or more application instances. In various embodiments, notification data may be provided to one or more application instances using a URL scheme-based approach. For example, the management agent may call an application instance using a URL scheme including the notification data as part of a uniform resource indicator (URI). In some embodiments, a library associated with application instance may process incoming notification data (e.g., received in a URI). In various embodiments, an application instance (e.g., not a library) may process an incoming notification data.

In some embodiments, notification data may be extracted from a notification data package (e.g., received from the OS-based notification platform, security management platform) and may be provided (e.g., copied) to a data storage location accessible to the application instance. The application instance intended to receive the notification data may receive the notification data when the application comes into the foreground (e.g., an active state) and may consume the notification data.

At 670, an output may be generated. In various embodiments, notification data may include text, images, videos, sounds, and/or other content. A display may be generated including at least a portion of the notification data (e.g., a representation of the notification data). The display may include a banner, alert, badge, and/or any other type of display. In another example, a sound may be output, a vibration output may be generated, and/or other notification may be provided based at least in part on the notification data.

Figure 7:
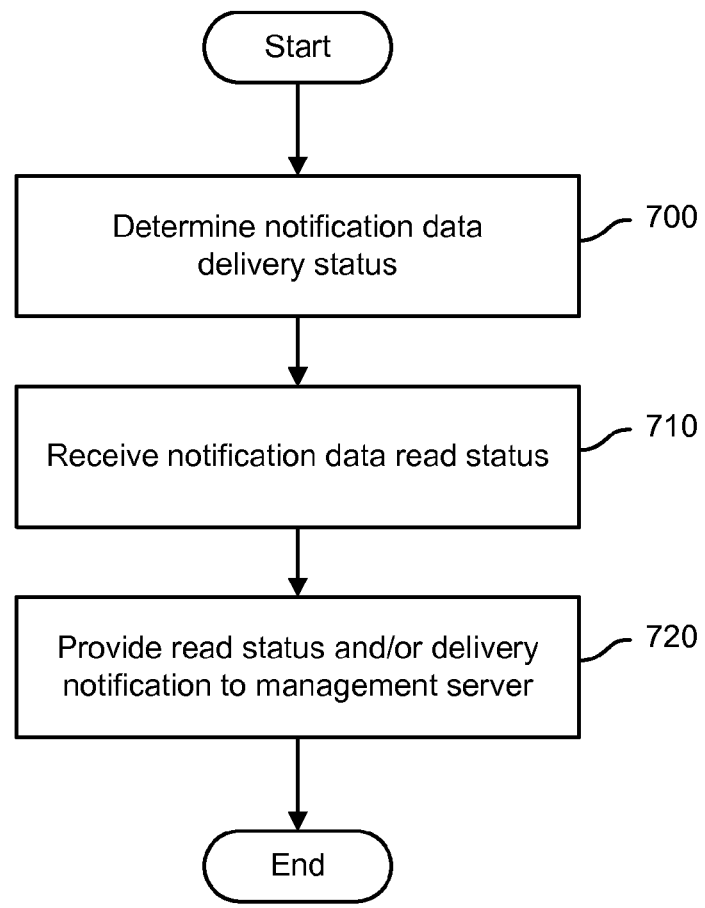
FIG. 7 is a flow chart illustrating embodiments of a process of determining notification data delivery and/or read status.

FIG. 7 is a flow chart illustrating embodiments of a process of determining notification data delivery and/or read status. In various embodiments, the process is performed by the system 100 of FIG. 1. At 700, a status associated with a delivery of notification data may be determined. In various embodiments, a management agent and/or other node may determine a delivery status associated with a notification data (e.g., a notification data object). In one example, a management agent may provide a notification data to an application instance, and upon providing the notification data to the application instance, the management agent may update a delivery status associated with the notification data to indicate that the notification data has been delivered (e.g., set the delivery status to "delivered"). In another example, an application instance may have received a notification data from an OS-based notification platform (e.g., directly from the platform), and a library associated with an application instance may provide a delivery status to the management agent upon receipt of the notification data.

At 710, a notification data read status may be received. In some embodiments, an application instance, library associated with an application, and/or other node may determine a read status associated with notification data. For example, a library associated with an application may determine that the notification data and/or representation thereof has been output to user (e.g., displayed to user). In various embodiments, a library associated with an application instance, an application instance, and/or other node may provide the read status information to the management agent.

At 720, read status information and/or delivery status information may be provided to a management server. In some embodiments, read status and/or delivery status may be provided to the security management platform from a management agent on the mobile device, an application, the mobile device OS, and/or another source.

Figure 8:
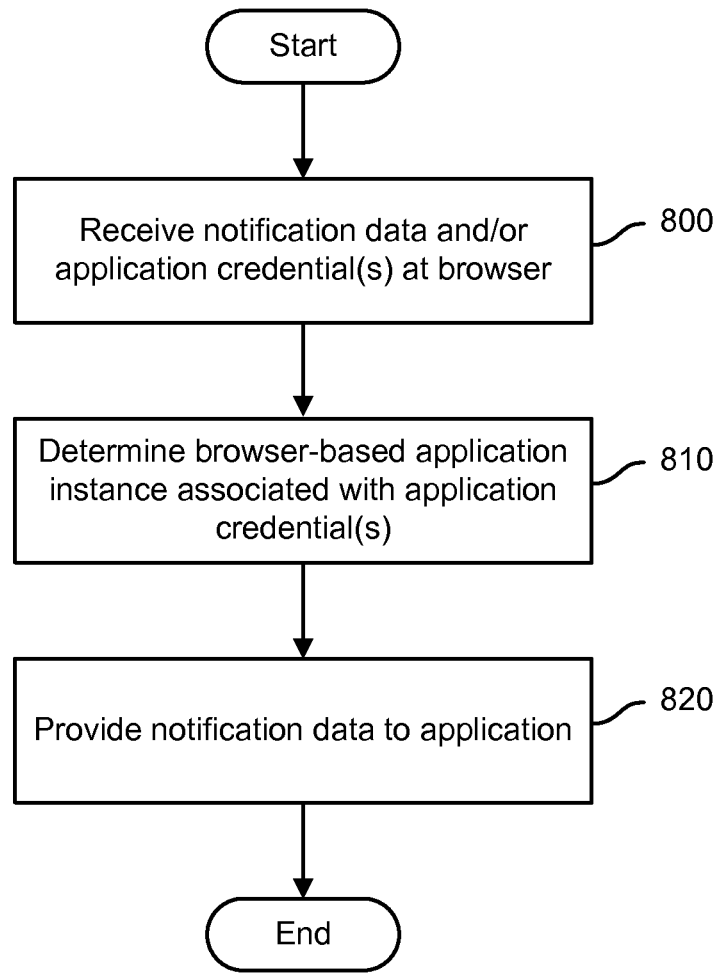
FIG. 8 is a flow chart illustrating embodiments of a process of providing notification data to browser-based applications.

FIG. 8 is a flow chart illustrating embodiments of a process of providing notification data to browser-based applications. In various embodiments, the process is performed by the system 100 of FIG. 1. In various embodiments, the process of FIG. 8 may illustrate an embodiment in which a browser application acts as a proxy for one or more browser-based application instances. At 800, notification data and/or application credentials may be received at a browser application. In various embodiments, notification data may be received at a browser application (e.g., an enterprise browser application) associated with one or more browser-based applications (e.g., HTML5 applications, web clip, etc.). In certain cases, the notification data and/or application credentials may be received from, for example, a management agent, an OS-based notification platform, security management platform, and/or other node using the techniques discussed herein. In various embodiments, the browser application may include a notification data proxy for one or more browser-based applications.

At 810, a browser-based application instance associated with the application credentials may be determined. In various embodiments, notification data received at the browser may include application credentials for one or more application instances. In this case, the notification data be processed (e.g., parsed) to retrieve one or more application credentials (e.g., GUID strings associated with application(s), HTML5 application identifier(s)). One or more browser-based application instances may be determined based on the application credentials.

At 820, notification data may be provided to one or more browser-based application instances. In various embodiments, a browser application may provide notification data to a browser-based application instance by, for example, launching the browser-based application and providing the notification data to the launched application instance. In some embodiments, the browser application may provide notification information to a secure storage location (e.g., secure application connection bus) accessible to the browser-based application. The browser-based application may, for example, retrieve the notification data from the secure storage location (e.g., at the next launch, when the application comes to the foreground, etc.).

In various embodiments, message delivery status, read status, and/or other information may be provided to the browser, management agent, and/or other node on the mobile device. The message delivery status, read status, and/or other information may then be provided to the security management platform. For example, a library associated with the browser application may determine message delivery status, read status and other information associated with the notification data. The library may provide message delivery status, read status, and/or other information to the management agent for delivery to the security management platform.

Figure 9:
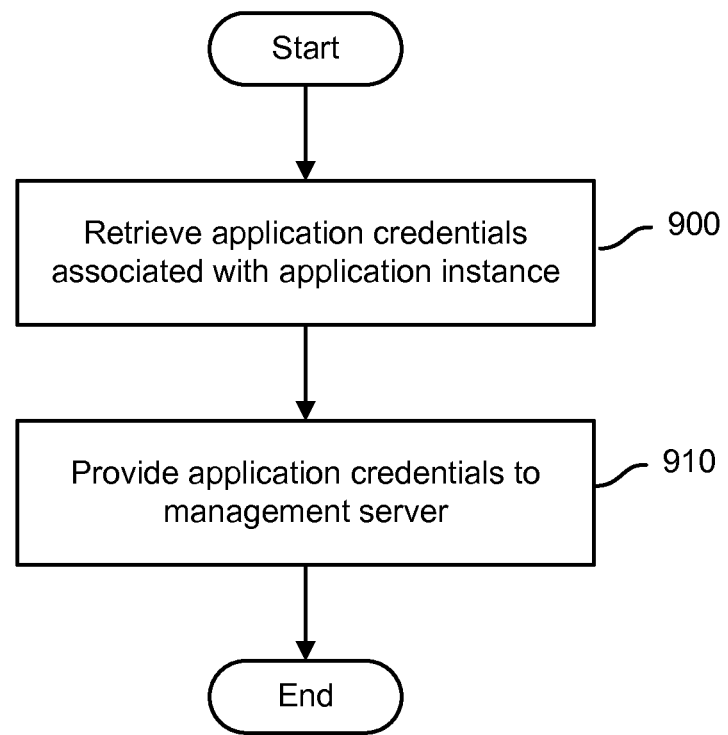
FIG. 9 is a flow chart illustrating embodiments of a process of retrieving application credentials.

FIG. 9 is a flow chart illustrating embodiments of a process of retrieving application credentials. In various embodiments, the process is performed by the system 100 of FIG. 1. At 900, application credentials associated with an instance of an application may be retrieved. In some embodiments, application credentials (e.g., a push notification service token, registration identifier (ID), notification keys, etc.) may be retrieved from a library associated with an application instance (e.g., a managed application), an application instance, and/or other node. In one example, an application instance may be configured to receive OS-based push notification(s), and the application may generate application credentials used with OS-based push notification service. In this case, a library associated with application and/or the application may retrieve the application credentials from the application, and/or provide the application credentials to the management agent. The management agent may, for example, request the application credentials from the library, intercept the application credentials, and/or otherwise retrieve the application credentials.

In some embodiments, a library may generate application credentials (e.g., used in OS-based notification system) on behalf of an application. For example, an application instance may not be developed (e.g., originally developed) to include push notification capabilities. A library associated with the application may generate application credentials (e.g., a GUID string) to be used in an MDM-based notification system. The application credentials may be provided to and/or retrieved by the management agent.

At 910, application credentials may be provided to a management server. In various embodiments, application credentials (e.g., associated with one or more application instances) may be provided to the security management platform. For example, the management agent may provide application credentials associated with one or more application instances to the security management platform.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
receiving, at a security management platform, a notification data and application identification data;
using the application identification data to select a corresponding application credential associated with an application instance with which the application identification data is associated; and
providing the notification data and the application credential to a distribution node, wherein the distribution node is configured to provide the notification data to the application instance based on whether the application instance is configured to receive the notification data, wherein in the event the application instance is not configured to receive the notification data, the distribution node is configured to provide the notification data to a management agent.

2. The method of claim 1, wherein using the application identification data to select the application credential comprises using the application identification data to select an application credential from a plurality of application credentials stored in a database of application credentials.

3. The method of claim 1, wherein the application identification data includes user identifying data associated with a user.

4. The method of claim 1, wherein the application identification data includes application instance identification data associated with the application instance.

5. The method of claim 1, wherein the distribution node comprises an operation system-based notification platform.

6. The method of claim 1, wherein the distribution node comprises a management agent included on a mobile device associated with the application instance.

7. The method of claim 1, further comprising:
receiving, from a mobile device, one or more application credentials each associated with a corresponding application instance; and
storing the one or more application credentials in a database of application credentials.

8. The method of claim 1, wherein providing the notification data includes generating a uniform resource locator (URL) call that includes the notification data and an identification of the application instance.

9. A mobile device security platform management system, comprising:
a processor; and
a memory couple to the processor and configured to provide the processor with instructions which when executed cause the processor to:
receive a notification data and application identification data;
use the application identification data to select a corresponding application credential associated with at least one an application instance with which the application identification data is associated; and
provide the notification data and the application credential to a distribution node, wherein the distribution node is configured to provide the notification data to the application instance based on whether the application instance is configured to receive the notification data, wherein in the event the application instance is not configured to receive the notification data, the distribution node is configured to provide the notification data to a management agent.

10. The system of claim 9, wherein the processor is configured to use the application identification data to select the application credential at least in part by using the application identification data to select an application credential from a plurality of application credentials stored in a database of application credentials.

11. The system of claim 9, wherein the application identification data includes user identifying data associated with a user.

12. The system of claim 9, wherein the application identification data includes application instance identification data associated with the application instance.

13. The system of claim 9, wherein the distribution node comprises an operation system-based notification platform.

14. The system of claim 9, wherein the distribution node comprises a management agent included on a mobile device associated with the application instance.

15. A computer program product, the computer program product being embodied in a tangible non-transitory computer readable storage medium and comprising computer instructions for:
    receiving, at a security management platform, a notification data and application identification data;
    using the application identification data to select a corresponding application credential associated with at least one an application instance with which the application identification data is associated; and
    providing the notification data and the application credential to a distribution node, wherein the distribution node is configured to provide the notification data to the application instance based on whether the application instance is configured to receive the notification data, wherein in the event the application instance is not configured to receive the notification data, the distribution node is configured to provide the notification data to a management agent.

16. The computer program product of claim 15, wherein using the application identification data to select the application credential comprises using the application identification data to select an application credential from a plurality of application credentials stored in a database of application credentials.

17. The computer program product of claim 15, wherein the application identification data includes user identifying data associated with a user.

18. The computer program product of claim 15, wherein the application identification data includes application instance identification data associated with the application instance.

19. The computer program product of claim 15, wherein the distribution node comprises an operation system-based notification platform.

20. The computer program product of claim 15, wherein the distribution node comprises a management agent included on a mobile device associated with the application instance.

\* \* \* \* \*